United States Patent [19]
Patton et al.

[11] Patent Number: 5,753,111
[45] Date of Patent: May 19, 1998

[54] PHOTOGRAPHIC PROCESSOR AND IMPROVED FILTER ASSEMBLY

[75] Inventors: David Lynn Patton, Webster; John Howard Rosenburgh, Hilton; Ralph Leonard Piccinino, Jr., Rush, all of N.Y.

[73] Assignee: Eastman Kodak Company, Rochester, N.Y.

[21] Appl. No.: 724,483

[22] Filed: Sep. 30, 1996

[51] Int. Cl.⁶ ............... B01D 35/153; B01D 35/18; B01D 35/31; G03C 5/395
[52] U.S. Cl. ............... 210/167; 210/133; 210/136; 210/184; 210/185; 210/235; 210/416.1; 210/436; 210/443; 396/565; 396/576; 396/626
[58] Field of Search .................... 210/167, 235, 210/416.1, 133, 136, 184, 185, 436, 443; 396/565, 576, 626

[56] References Cited

U.S. PATENT DOCUMENTS

| | | |
|---|---|---|
| 2,955,712 | 10/1960 | Gutkowski . |
| 3,306,451 | 2/1967 | Kudlaty . |
| 3,341,018 | 9/1967 | Kudlaty . |
| 3,399,776 | 9/1968 | Knuth . |
| 3,699,869 | 10/1972 | Jensen . |
| 4,059,520 | 11/1977 | Roller . |
| 4,168,117 | 9/1979 | Work . |
| 4,341,642 | 7/1982 | Koepke . |
| 4,402,590 | 9/1983 | Rubin . |
| 4,577,951 | 3/1986 | Takahashi et al. . |
| 4,615,812 | 10/1986 | Darling . |
| 4,708,453 | 11/1987 | Fryda et al. . |
| 4,814,809 | 3/1989 | De Prijcker et al. . |
| 4,872,033 | 10/1989 | Watanabe et al. . |
| 4,907,023 | 3/1990 | Koboshi et al. . |
| 4,922,276 | 5/1990 | Lamprecht et al. . |
| 4,994,837 | 2/1991 | Samuels et al. . |
| 5,001,506 | 3/1991 | Nakamura . |
| 5,179,404 | 1/1993 | Bartell et al. . |
| 5,335,190 | 8/1994 | Nagle et al. . |
| 5,347,337 | 9/1994 | Patton et al. . |
| 5,361,114 | 11/1994 | Earle . |
| 5,379,087 | 1/1995 | Devaney et al. . |
| 5,386,261 | 1/1995 | Patton et al. . |
| 5,396,316 | 3/1995 | Smith . |
| 5,400,106 | 3/1995 | Rosenburgh et al. . |
| 5,420,658 | 5/1995 | Manico et al. . |
| 5,477,300 | 12/1995 | Fujimoto et al. . |

FOREIGN PATENT DOCUMENTS

0 675 072  10/1995  European Pat. Off. .

*Primary Examiner*—Thomas M. Lithgow
*Attorney, Agent, or Firm*—Frank Pincelli; David A. Novais

[57] ABSTRACT

A quick disconnect filter assembly and manifold assembly for use in a photographic processor having a recirculating system designed for receiving a filter assembly in line. The filter assembly comprising: a housing having an internal chamber, a chamber inlet for allowing processing fluid to flow into the internal chamber and an chamber outlet for allowing processing solution to flow out of the internal chamber. The housing has a quick disconnect valve for allowing quick connection and disconnecting of the filter assembly with the recirculating system without any substantial loss of fluid. The manifold assembly comprising: a body having an inlet port and an outlet port and a fluid connecting passage therethrough connecting the inlet to the outlet. A wall member is provided for dividing the connecting passage into a first receiving section and an outer delivery section. The receiving section having a first half valve section secured thereto which is designed to mate with a second half valve section connected to another item so as to provide fluid connection therethrough. The second delivery section having a third half valve section secured thereto which is designed for engaging a mating fourth half valve section on another item.

9 Claims, 11 Drawing Sheets

PHOTOGRAPHIC PROCESSOR AND IMPROVED FILTER ASSEMBLY

FIELD OF THE INVENTION

The present invention relates to photographic processors and improved filter assemblies for use therewith.

BACKGROUND OF THE INVENTION

Photographic processors in the prior art are typically provided with a filter disposed in the recirculation system for filtering particles in the recirculating processing solution. When the filter material has to be changed, the operator has to make sure that the solution level of the tank in the processing apparatus, which is serviced by the filter, is below the fluid level within the filter assembly. This generally requires lowering of the fluid level in the processing tank. The operator must then carefully remove the filter cap and then remove the filter material and replace it with clean filter material. This usually results in processing solution being spilled, dripped, or splashed onto the surrounding area. In addition, this process can result in future leaks if the filter cap is not replaced properly after the filter material has been replaced. Furthermore, once the used filter material has been removed from the filter housing, it has to be placed in a container since it is still filled with processing solution. The replacement process is also relatively time consuming resulting in the processor being down and not capable of processing photosensitive material, thus minimizing the efficiency of the processor.

Thus, it is desirable to provide an apparatus which facilitates easy removal and replacement of the filter material or filter assembly. Additionally, there is a need to provide a process whereby this can be done quickly and easily. Further, there is also a need to provide a filter assembly that allows or minimizes the need of reducing the level of the processing solution in the tank.

An additional problem with prior art processors is retaining air trapped in the filter housing. If this occurs, the processing solution can still be recirculated through the recirculation system, however, without removing the undesired particles which can reduce effective life of the processor and the processing solution.

The present invention provides an improved photographic processor and filter assembly which allows for quick and easy removal of the filter assembly, minimizes leaks, and further allows for the placement of the filter assembly in any position with respect to the solution level of the tank. Additionally, the filter assembly minimizes the possibility of retaining trapped air within the filter housing.

SUMMARY OF THE INVENTION

A quick disconnect filter assembly and manifold assembly for use in a photographic processor having a recirculating system designed for receiving a filter assembly in line. The filter assembly comprises: a housing having an internal chamber, a chamber inlet for allowing processing fluid to flow into the internal chamber and an chamber outlet for allowing processing solution to flow out of the internal chamber. The housing has a quick disconnect valve for allowing quick connection and disconnecting of the filter assembly with the recirculating system without any substantial loss of fluid. The manifold assembly comprises: a body having an inlet port and an outlet port and a fluid connecting passage therethrough connecting the inlet to the outlet. A wall member is provided for dividing the connecting passage into a first receiving section and an outer delivery section. The receiving section having a first half valve section secured thereto which is designed to mate with a second half valve section connected to another item so as to provide fluid connection therethrough. The second delivery section having a third half valve section secured thereto which is designed for engaging a mating fourth half valve section on another item.

These and other advantages of the present invention will be more clearly understood and appreciated from a review of the following detailed description and appended claims, and by reference to the accompanying drawings.

DETAILED DESCRIPTION OF THE INVENTION

Figure 1:
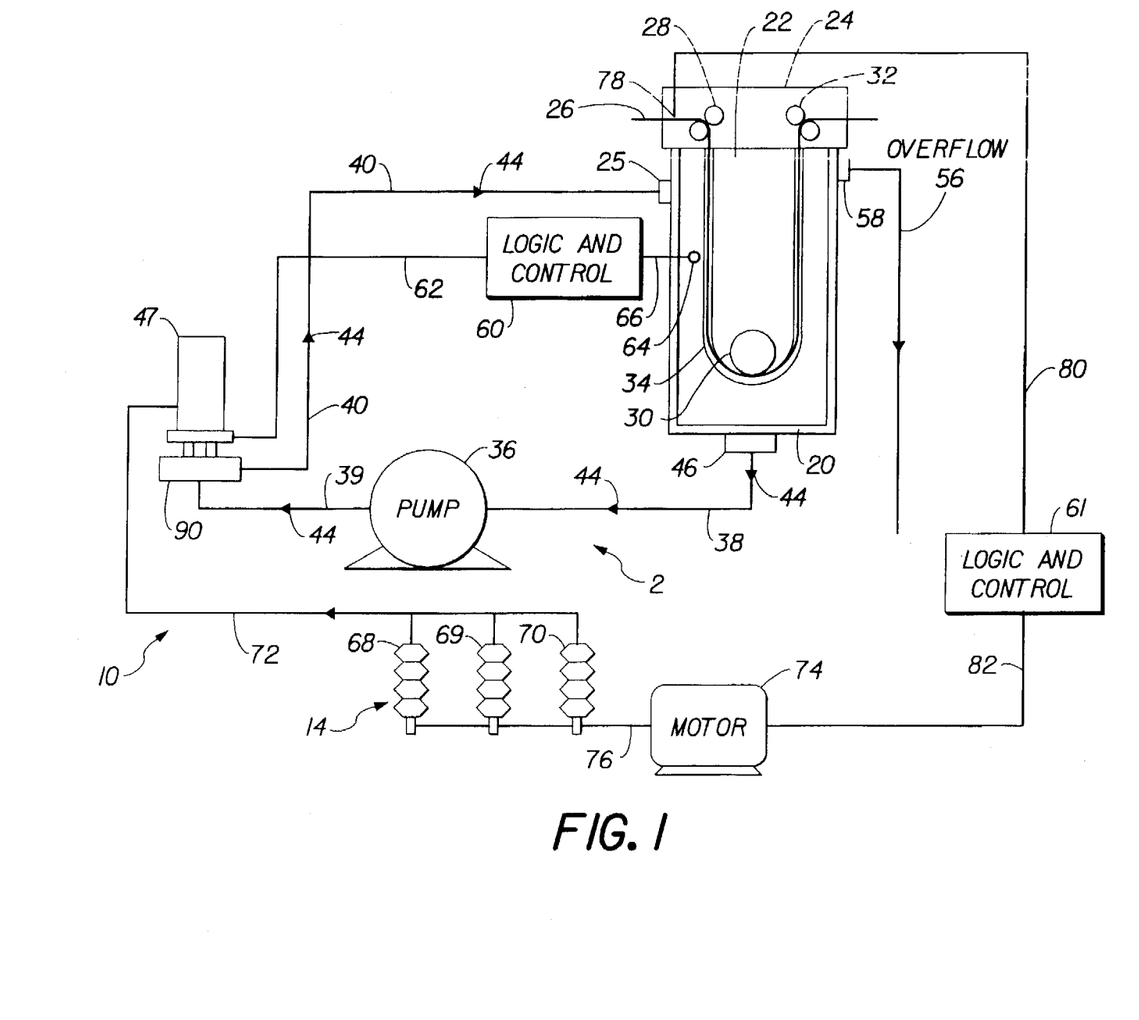
FIG. 1 is a schematic drawing of a photographic processing system of an apparatus made in accordance with the present invention.

Referring to FIG. 1, there is illustrated in schematic form a photographic processing apparatus 10 made in accordance with the present invention having a photographic processing solution recirculation system 12 and a replenishment system 14. The apparatus 10 includes as processing tank 20, which holds a photographic processing solution 22 and a rack 24, which transports the sensitized material 26 through the tank 20 via entry roller pair 28, turn-around roller 30, exit roller pair 32, and sensitized goods rack 34. Recirculation system 12 includes a recirculation pump 36 and conduits 38,39,40 which causes processing solution to flow in the direction indicated by arrows 44. The tank 20 is connected to recirculation pump 36 via tank outlet 46 and conduit 38. The recirculation pump is connected to filter assembly 47 via conduit 39. The tank 20 includes an overflow conduit 56 via overflow port 58. Control and logic unit 60 is connected to a heater 182 (see FIG. 4) provided in filter assembly 47 via wire 62 and to temperature sensor 64 via wire 66. The replenishment system 14 includes metering pumps 68,69,70 which are respectively connected to the filter assembly 47 via conduit 72. A photographic processing replenishment chemical is used to replenish the photographic processing solution. Solution is introduced to the metering pumps 68,69,70, which are driven by motor 74 and connecting linkage 76. Pumps 68,69,70 are used to provide the correct amount of chemicals into the recirculation system 12. When photosensitive material sensor 78 senses photosensitive material entering the tank it transmits a signal to motor 74 via wire 80, logic and control unit 61, and wire 82, respectively. While logic and control units 60,61 are illustrated as two separate units, they are preferably a single unit and have been illustrated as two units for sake of clarity. Motor 74 drives pumps 68,69,70 via connecting linkage 76, thereby introducing the correct amount of photographic processing replenishment chemicals into conduit 72.

Figure 2:
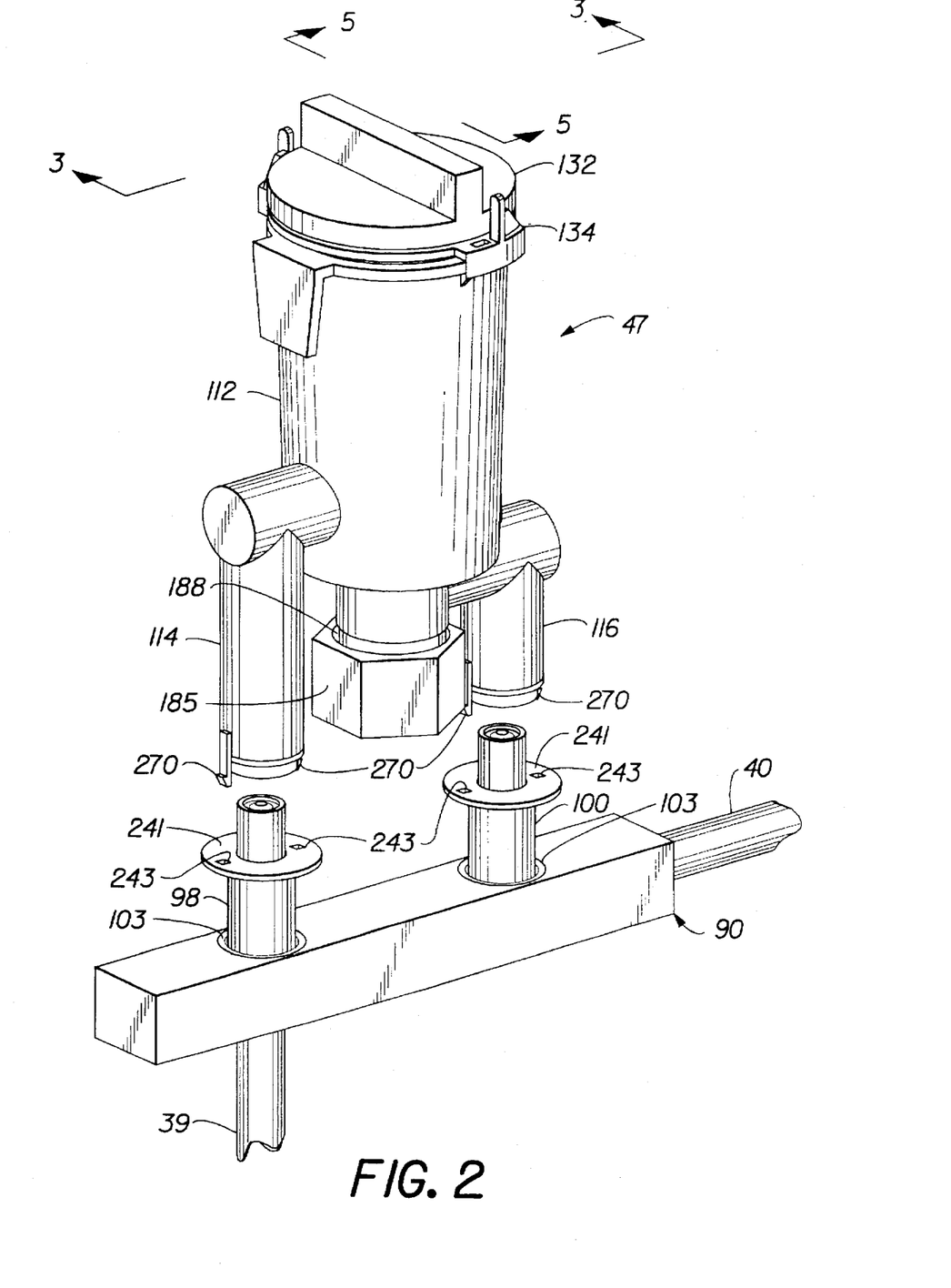
FIG. 2 is an enlarged exploded view of the filter assembly and a portion of the recirculating system to which the filter assembly is mounted.
Figure 3:
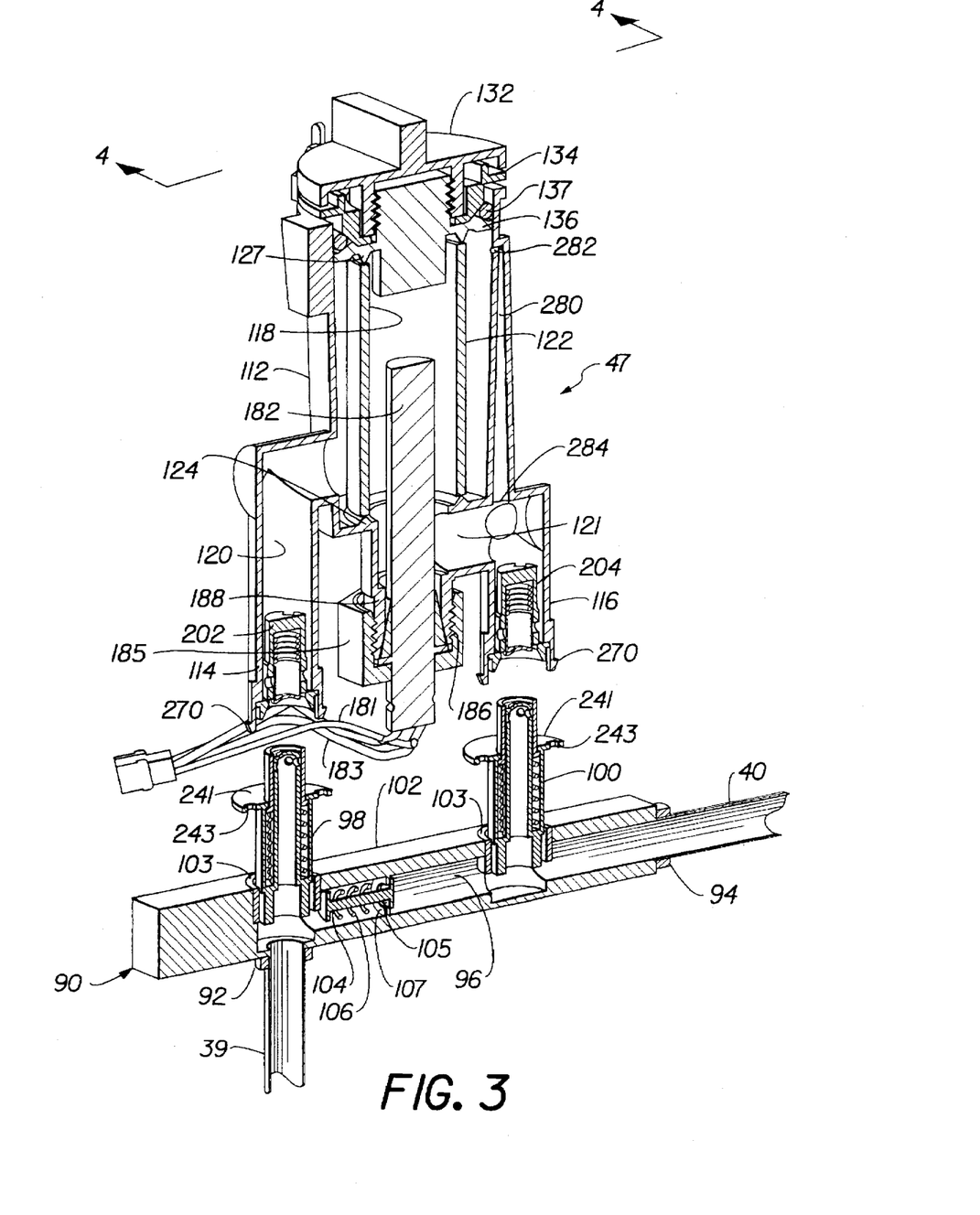
FIG. 3 is a cross-sectional view of FIG. 2.
Figure 4:
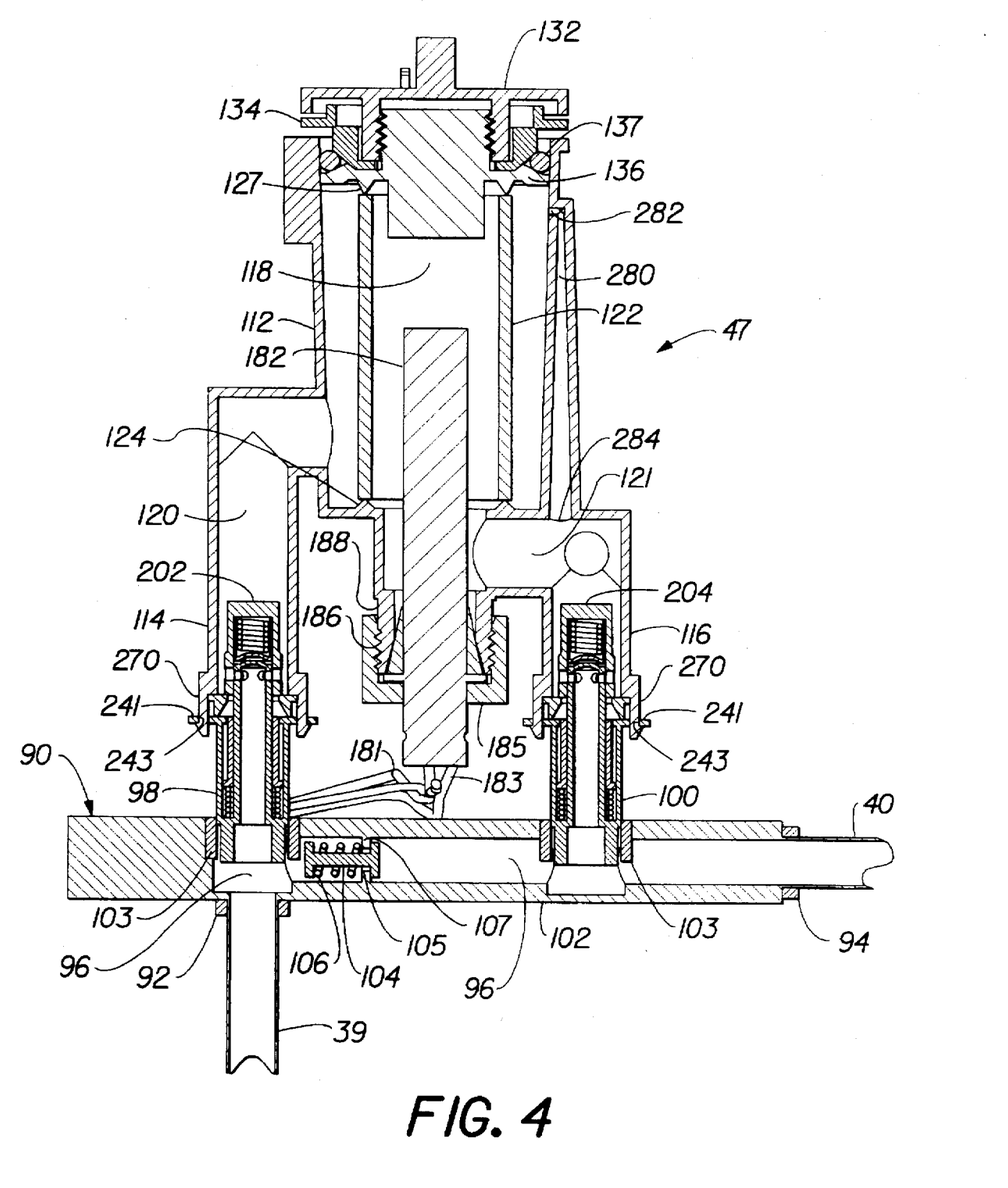
FIG. 4 is a cross-sectional view of the filter assembly and associated mounting manifold as taken along line 4—4 of FIG. 3 in the assembled state.

Referring to FIGS. 2–6, there is illustrated in greater detail the filter assembly 47 and how it is connected to the recirculating system 12. In particular, the recirculation system 12 includes a mounting manifold 90 having an inlet port 92 and an outlet port 94. In the particular embodiment illustrated, the inlet port 92 is connected to conduit 39, which is connected to pump 36 and outlet port 94 is connected to conduit 40, which is in fluid communication with inlet port 25. Mounting manifold 90 has a supply passage 96 connecting inlet port 92 to outlet port 94. The mounting manifold 90 includes an outlet half valve section 98 which is flexibly mounted to body portion 102 of manifold 90 by an annular resilient member 103. The resilient member 103 allows the outlet half valve section 98 to have a sufficient degree of movement so that is may properly align with a mating half valve section secured to filter assembly 47 which is discussed later herein. In the embodiment illustrated, an inlet half valve section 100 is provided for allowing fluid to return to manifold 90. The inlet half valve section 100 is also flexibly mounted to the body 102 by a second annular resilient member 103. The inlet half valve section 100 is also designed to mate with a mating valve half that is secured to filter assembly 47 which is also discussed later herein. The manifold 90 further includes a stop assembly which comprises a stop member 104 which extends through an opening 105 provided in wall/partition 107 disposed in passage 96 and is biased in the closed position by spring 106 as illustrated in FIG. 4. The outlet half valve section 98 and inlet half valve section 100 in the positions illustrated, do not allow fluid to flow therethrough. Thus, any fluid entering inlet port 92 will provide a force against stop member 104 and upon reaching a predetermined amount of force will cause the member 104 to be pushed to the right thereby opening the opening 105 so as to allow fluid to pass therethrough to outlet port 94.

Mounted to manifold 90 is a filter assembly 47 which includes a housing 112 having an inlet port 114 and outlet port 116. The housing 112 includes an internal chamber 118, which in the particular embodiment illustrated, is substantially cylindrical in shape. Chamber 118 is in fluid communication to inlet port 114 and outlet 116 port by passages 120,121, respectively. Disposed within the internal chamber 118 there is provided a cylindrical shell filter member 122 which is held in position in internal chamber 118 by annular projecting member 124 provided in bottom wall 126 and projection 127 in lid assembly 130. It is to be understood that this cylindrical shell filter member may be composed of any desired filtering material. In the particular embodiment illustrated, the filter member 122 is made of cellulose.

Figure 5:
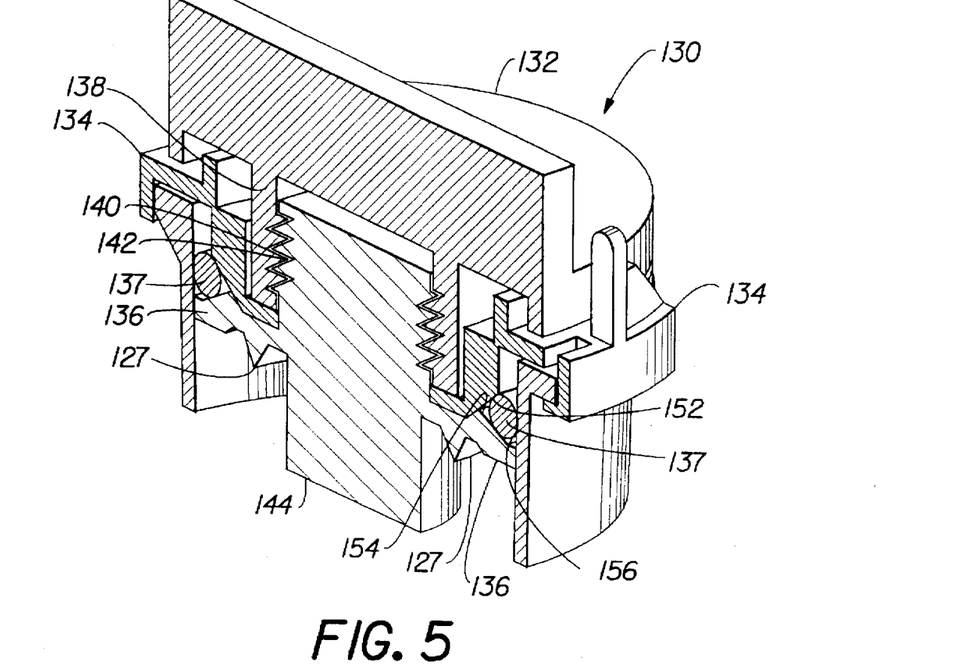
FIG. 5 is an enlarged cross-sectional view of the upper portion of the filter assembly of FIG. 2 as taken along line 5—5.
Figure 6:
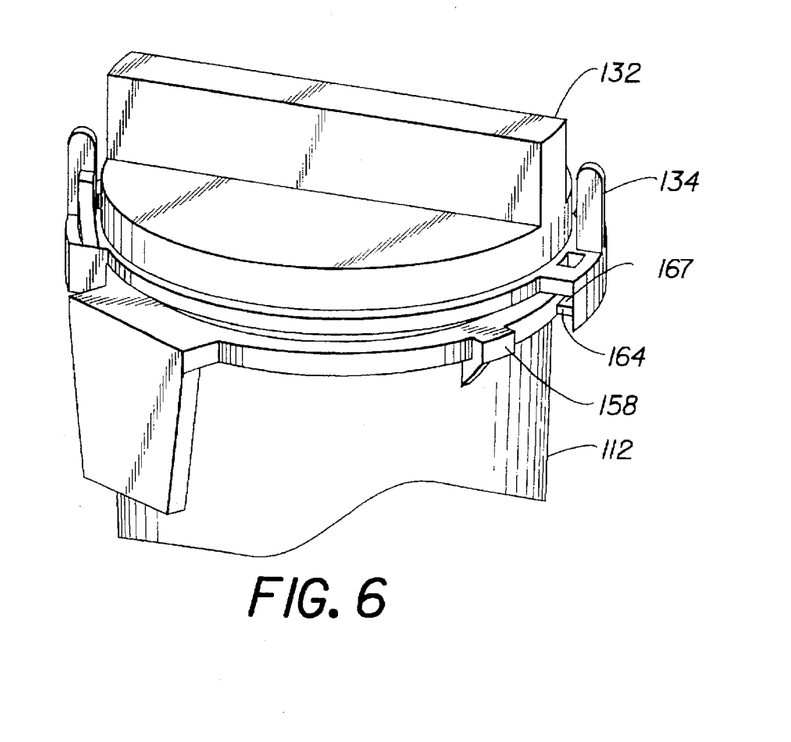
FIG. 6 is an enlarged perspective view of the upper portion of the filter assembly of FIG. 2 illustrating closing of the lid.

Referring to FIGS. 5 and 6, there is illustrated in greater detail the lid assembly 130 which is used for sealing internal chamber 118 and also for allowing for access thereto as required. The lid assembly 130 is designed so as to provide a fluid tight connection with housing 112. In the particular embodiment illustrated, the lid assembly 130 comprises a lid 132, a clamping ring 134, a sealing member 136, and O-ring 137. The lid 132 has a downwardly extending annular member 138 having internal threads 140 which engage external threads 142 in core member 144 of sealing member 136. The threads 140,142 are designed such that when lid 132 is rotated with respect to the sealing member, the two parts will be pulled closer together, thereby drawing clamping ring 134 and O-ring 137 therebetween. The sealing member 136 includes an annular projecting portion 127, which is designed to engage and meet with the upper end of shell filter 122. O-ring 137 engages sealing surfaces 152 of clamping ring 134 and sealing surface 154 of sealing member 136. When the lid 132 is rotated in the appropriate direction for causing the lid 132 and sealing member to be drawn together, the O-ring 137 will be caused to be pushed outwardly such that the outer surface of the O-ring 137 will engage the inner surface 156 of housing 112, the surface 152 of the clamping ring 134, and the sealing surface 154 of the sealing member 136, thereby providing a fluid sealing relationship between the lid assembly 130 and housing 112.

Figure 7:
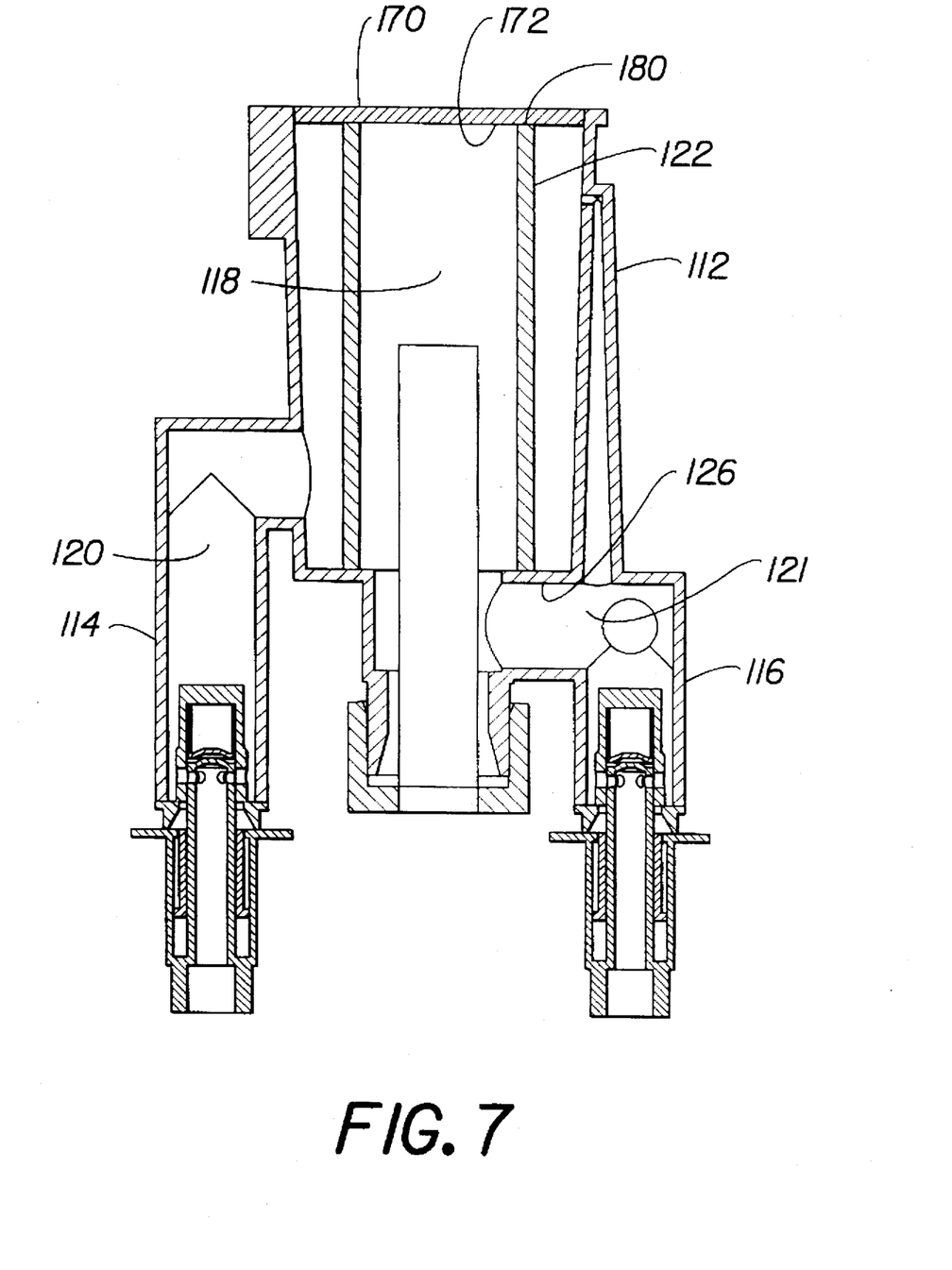
FIG. 7 is a view similar to FIG. 4 illustrating a modified filter assembly made in accordance with the present invention.

The lid assembly 130 is held securely to housing 112 by means of a pair of flange members 158, which are integrally formed as a part of clamping ring 134, which include a sealing lip section 160, which engages the bottom surface 162 of annular flange 164 formed at the upper end of housing 112. By rotating the lid assembly such that the clamping ring 134 is placed into engagement with flange 164 causes the lid assembly to be held securely to housing 112. It is, of course, understood that any other mechanism or type of lid assembly may be used for securing the lid assembly to the housing. Alternatively, the lid 132 may be permanently sealed to the housing. Referring to FIG. 7, there is illustrated a modified filter assembly made in accordance with the present invention, like numerals indicating like parts and operation, as previously discussed. In this particular embodiment, a lid 170 is ultrasonically welded to the housing 112 and is positioned such that the bottom surface 172 engages the top 180 of filter 122.

Referring back to FIGS. 2–6, the filter assembly further includes a heating element 182 which is connected to a source of power and logic and control unit 60, which controls the activation of heating element 182 as appropriate in accordance with various sensors used to measure temperature either within the housing or at some other point in the processing system. In the particular embodiment illustrated, the element 182 is connected to logic and control unit 60 by a pair wires 181,183. A threaded cap 185 securely holds the heating element 182 by engaging threads 186 in projecting member 188 of housing 112. It is, of course, understood that the heating element may be secured permanently to housing 112, or in any other replaceable manner so desired.

Figure 9:
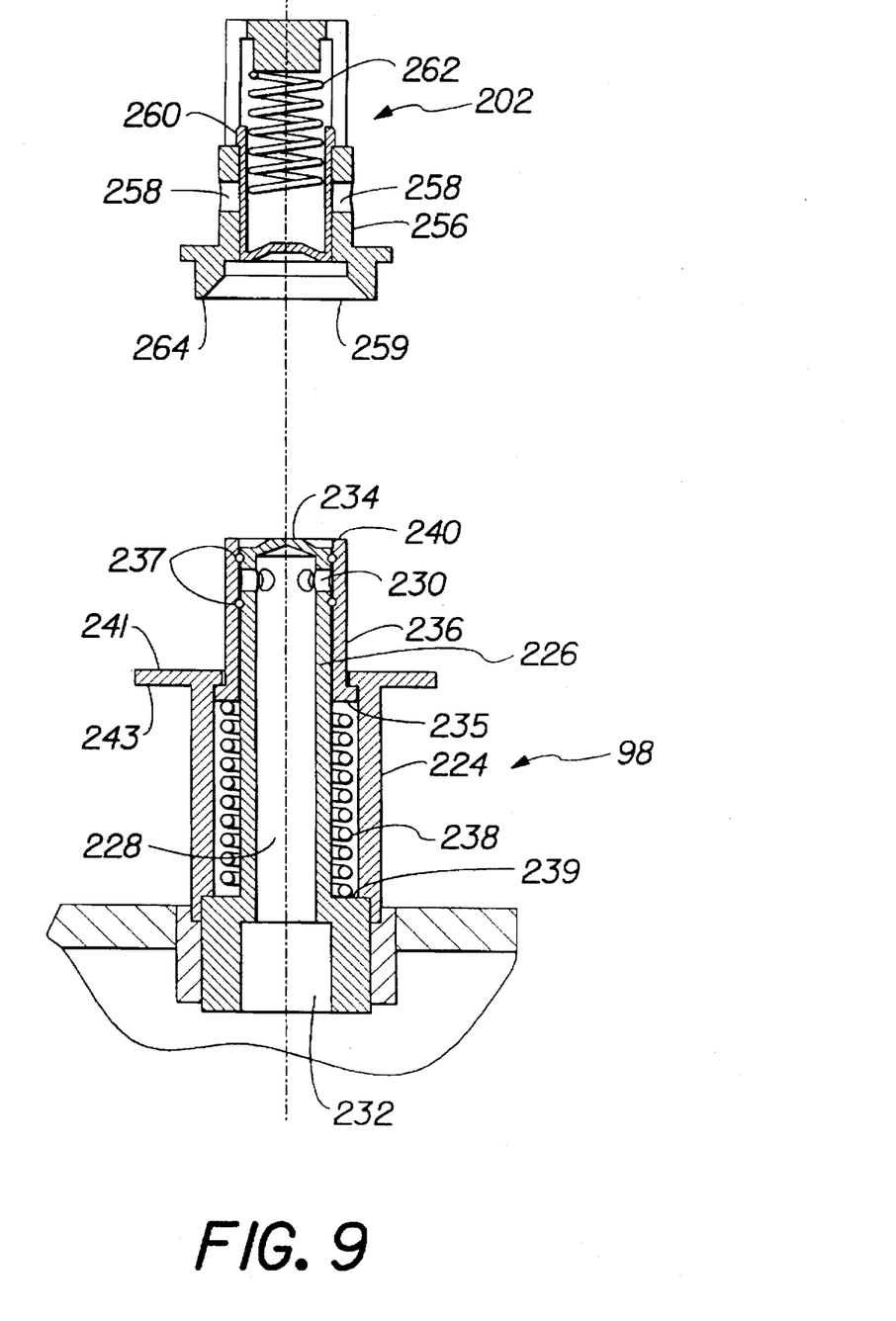
FIG. 9 is an enlarged exploded cross-sectional view of one of the outlet half valve sections and mating half valve sections used to fluidly connect the filter assembly to the mounting manifold.

The inlet port 114 of housing 112 is provided with a mating half valve section 202 which is designed to mate and engage with outlet half valve section 98 in manifold 90. In a similar manner, outlet port 94 is provided with a mating half valve section 204 designed to mate with inlet half valve section 100. The mating half valve sections 202,204 mate with half valve sections 98,100, respectively, so as to form two fluid connecting passages between the filter assembly 47 and mounting manifold 90. In the particular embodiment illustrated, the mating half valve sections 202,204 and half valve sections 98,100 combine together to form a pair of substantially dripless valve assemblies, such as described in greater detail in EPO Publication 675,072, which is hereby incorporated by reference in its entirety. In the particular embodiment illustrated, the half valve sections 98,100 are male mating sections which mate with female mating sections 202,204. However, it is to be understood that the male or female sections may be place in either the housing 112 and/or manifold 90 as desired. For the purpose of the present invention, dripless valve assembly shall mean valve assembly wherein little or substantially no fluid is leaked upon connecting or disconnecting of the associated members. For the sake of clarity, only one of the half valve sections 98,100 will be described in detail, it being understood that the other is identical, and likewise, only one of the mating half valve sections 202,204 will be discussed, it being understood that the other is identical in form and operation. Referring to FIG. 9, the outlet half valve section 98 comprises a body member 224. An elongated proboscis member 226 is positioned concentrically within body member 224. Proboscis member 226 comprises a longitudinal channel 228 having a plurality of radial fluid ports 230 which allow fluid to pass therethrough, and a fluid passage 232 to deliver or receive fluid. Ports 230 are positioned at a closed end portion 234 of channel 228. A moveable blocking member 236, preferably a sleeve, is slideably mounted telescopically around proboscis member 226 for selectively opening and closing ports 230. A pair of resilient O-rings 237 provide a seal between members 236 and proboscis member 226 on either side of port 230. A spring member 238 is captured between blocking member 236 and a shoulder 239 on proboscis member 226, normally biasing block member 236 to the position illustrated in FIG. 4 in which ports 230 are closed or blocked. A radial flange 235 and sleeve 236 engages member 226 to limit movement of the sleeve 236. The body member 224 also includes a registration surface 241 upon which the mating half valve section 202 engage.

Mating half valve section 202 comprises a first body member 256; a plurality of entrance ports 258 for allowing fluid to pass therethrough; a hollow piston 260 slideably mounted within the body member 256 from a first position (as illustrated in FIG. 3) closing entrance ports 258 to a second position, opening entrance ports 258 (as shown in FIG. 4) and a spring member 262 captured between body 256 and piston 260 for normally biasing piston 260 to close ports 258. For ease of manufacture, ports 258 may be located as pairs on opposite sides of body 256. A flared lip 259 is provided in first body member 256 which engages registration surface 240 on blocking member 236. When the mounting half valve section 202,204 and valve half sections 98,100 are in the position illustrated in FIG. 3, the ports 230,258 are closed. When the filter assembly 47 is mounted to manifold 90, fluid connection will be established therebetween. In particular, when the filter assembly 47 is mounted to manifold 90, the inlet port 114 and outlet port 116 are brought into engagement such that the mating half valve sections 202,204 engage half valve sections 98,100, respectively, such that fluid passages will be provided therebetween. In particular, when the flared lip 259 is brought into engagement with registration surface 240, the flared lip 259 engages surface 240 on blocking member 236. Continued movement causes blocking member 236 to retract to the position of FIG. 4, thus opening entrance ports 230. At the same time, proboscis member 226 engages and displaces piston 260 into the position of FIG. 4, thus opening ports 258. Entrance ports 258 and inlet ports 230, thus form an open fluid passes from the manifold 90 to the interior of the filter assembly 47. The filter is completely mounted when the terminal end 264 of body 256 engages registration surface 241.

In the embodiment illustrated, a pair of projections 270 (FIG. 3) are provided on the inlet port 114 and outlet port 116. The projections 270 each engage an mating opening 243 in registration surface 241 such that the filter assembly 47 will be held securely thereto. Since the half valve sections 98,100 are flexibly mounted, they are capable of moving sufficiently so as to properly align with corresponding half valve sections 202,204, respectively. This engaging of latching members 270 allow the two items to be disengaged for replacement. When the filter assembly 47 is in the engaged position with mounting manifold 90, fluid will flow through inlet port 92 through outlet half valve section 98 into mounting half valve section 202 through passage 120 into internal chamber 118. The fluid will be forced through the filter 122 into passage 121 and out outlet 116, returning through half valve section 100 and half valve section 204 such that the fluid will flow back into the manifold 90 and out outlet port 94. When the filter valve assembly is in the disengaged position, fluid pressure will flow into inlet port causing the stop member 104 to be moved to the right and allowing fluid to automatically pass on through. In the event that there is a blockage in the filter housing, the stop member 104 allows fluid to continue through the recirculating system, thus allowing the processing apparatus to continue its normal function.

In the preferred embodiment illustrated, the filter assembly 47 is provided with air bleed means for removing trapped air within the internal chamber 118 so as to allow proper fluid flow through the filter assembly. In the particular embodiment illustrated, this is accomplished by use of an air bleed passage 280 formed in housing 112. The passage 280 includes a first connecting end 282, which is in fluid communication with the internal chamber 118 and a second outlet end 284, which is in fluid communication with the outlet passage 121. The first connecting end 282 is located with respect to the internal chamber 118 such that fluid will be removed. Preferably, the end 282 is located at the high level of the internal chamber such that any air trapped within the internal chamber 118 will be in fluid communication with the end 282. As fluid passes through the filter assembly, as illustrated in FIG. 4, this causes a vacuum to be formed in passage 280, thus drawing any excess air/gas that may be present in the internal chamber 118 out through the system which eventually gets passed out of the system. In this manner, there is minimized the possibility of air being trapped within the internal chamber and, thus effecting the overall performance of the filter assembly. This also allows placement of the filter assembly 47 below fluid level in the processing tank and also allows the filter assembly to be positioned in any orientation. Preferably, the filter assembly 47 is oriented such that the connecting end 282 is at the highest fluid position.

Figure 8:
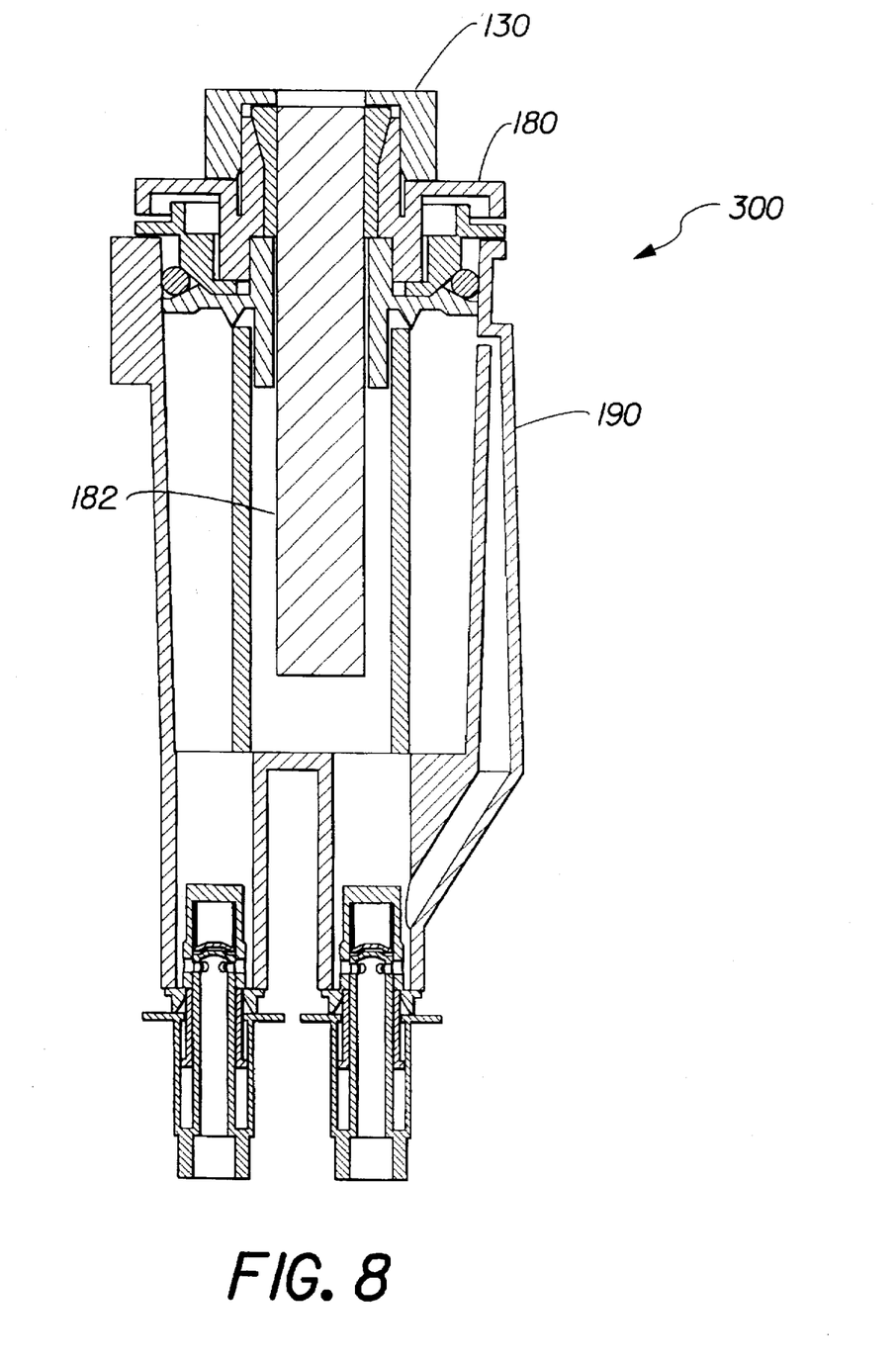
FIG. 8 is a view similar to FIG. 4 illustrating yet another modified filter assembly made in accordance with the present invention.

Referring to FIG. 8, there is illustrated a modified filter assembly 300 made in accordance with the present invention. The filter assembly 300 is similar to filter assembly 47, like numerals indicating like parts and operation. In this embodiment a heating element 182 is provided as an integral part of the lid assembly 130. Thus by simply using different type lid assemblies, the filter assembly 300 may be used to heat or not heat fluid passing therethrough.

Figure 10:
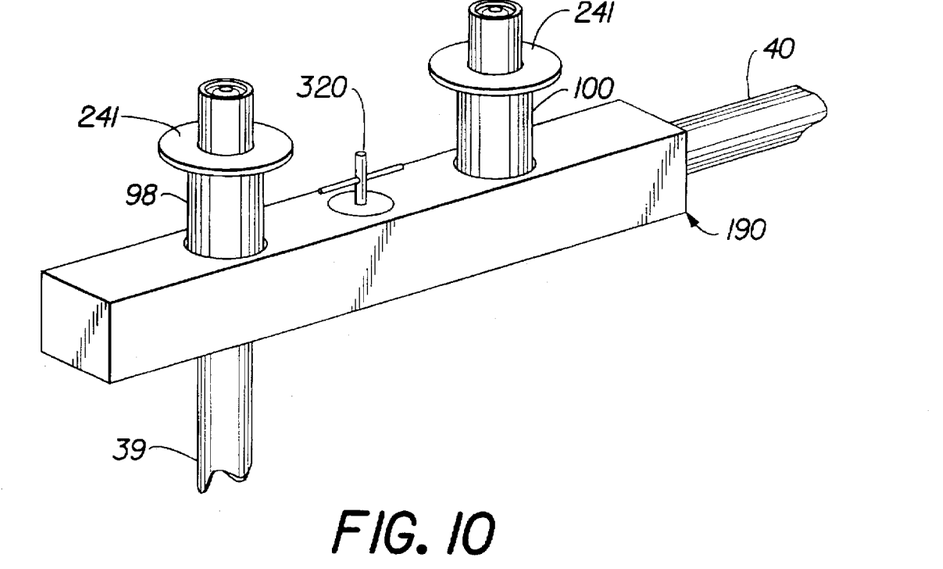
FIG. 10 is a view similar to FIG. 2 illustrating a modified mounting manifold made in accordance with the present invention.
Figure 11:
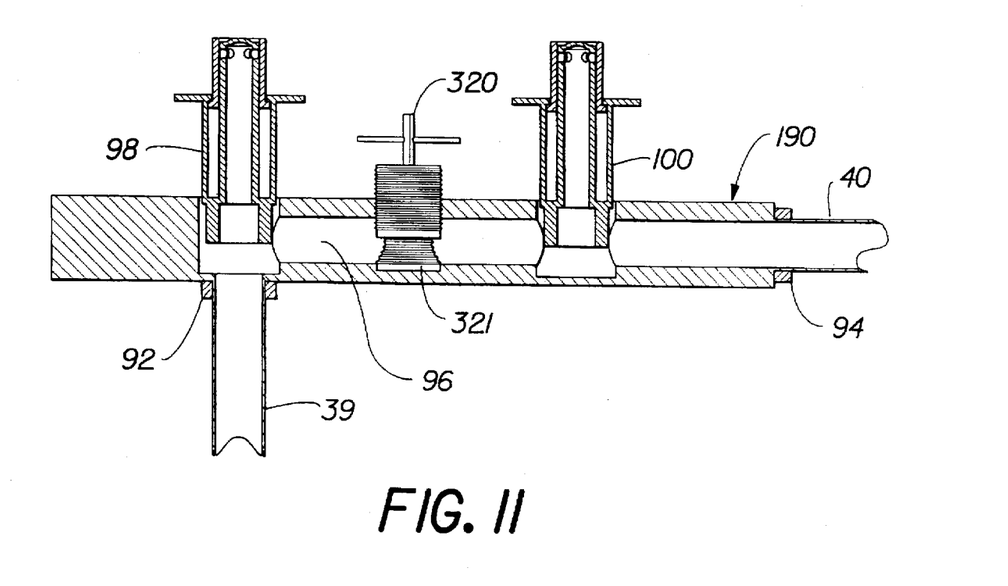
FIG. 11 is a cross-sectional view of the filter assembly and mounting manifold of FIG. 10 as taken along line 11—11.

Referring to FIGS. 10 and 11, there is illustrated a modified mounting manifold 190 of the present invention. Manifold 190 is similar to manifold 90, like numerals indicating like parts and operation. In this embodiment, the manifold 190 is provided with a different mechanism for allowing fluid to pass therethrough and not through the filter assembly. A manual turn valve 320 is provided which threadingly engages a threaded opening 321 in the manifold such that when the turn valve is fully threaded to the position illustrated in FIG. 10, valve 320 fully blocks the passage 96. However, when partially unthreaded to the position illustrated in FIG. 11, it allows fluid to pass through the manifold. Thus when the filter assembly is removed by simply threading the valve member in the appropriate direction, fluid passage 96 will be made between inlet port 92 and outlet port 94.

Figure 12:
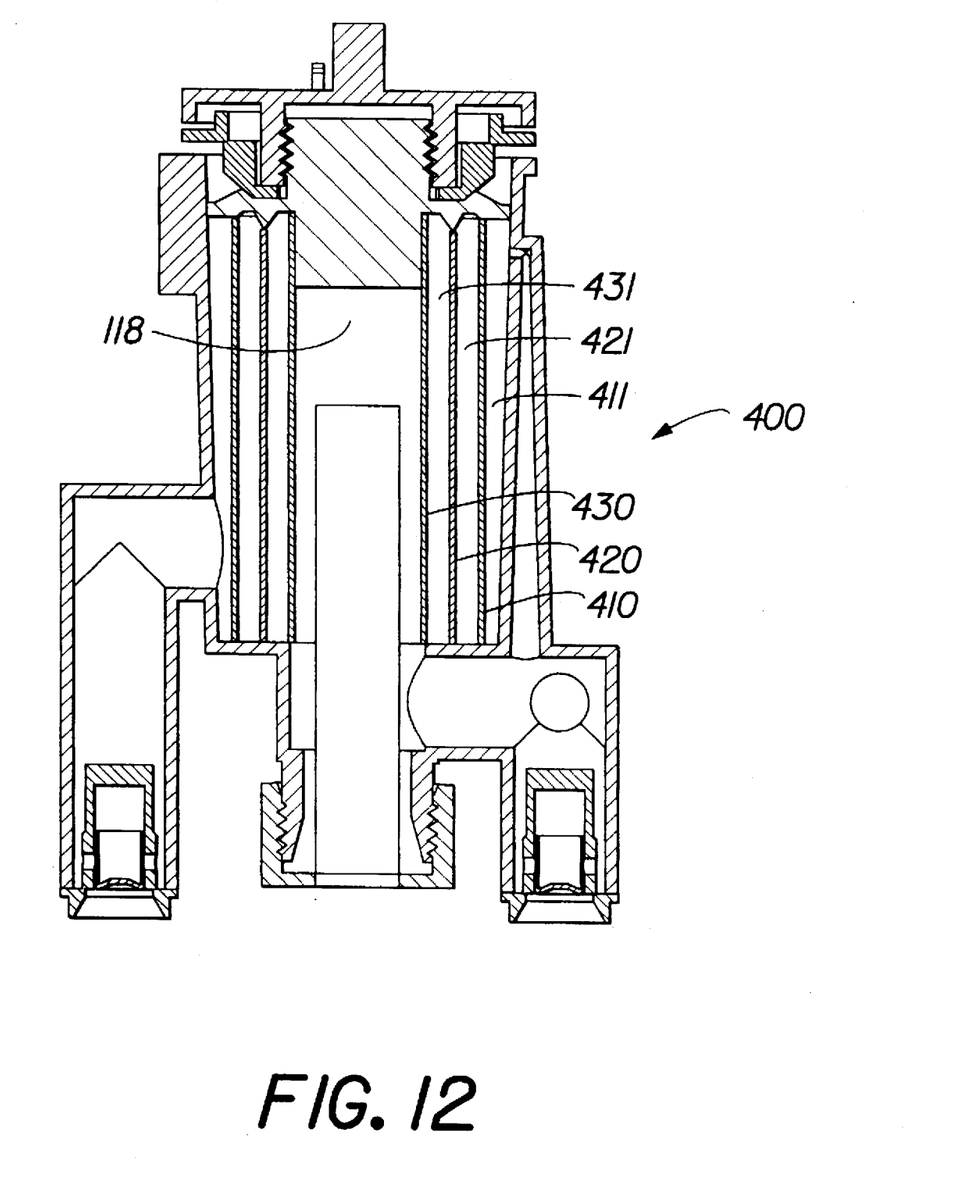
FIG. 12 is an enlarged cross-sectional view of yet another modified filter assembly made in accordance with the present invention.

Referring to FIG. 12, there is illustrated yet another modified filter assembly 400 made in accordance with the present invention. In this embodiment, the filter assembly 400 includes a plurality of concentric wall members 410, 420,430 which separate the internal chamber 118 into three different retaining areas 411,421,431. In each one of these retaining areas 411,421,431, a filter material or other chemical treating material may be placed therein. For example, in the outer retaining area 411 there may be placed filter material in the form of paste, powder, granular materials, tablets, etc., for removing particulate matter whereas retaining area 421 may contain a resin. For example, a mixed bed resin (for example, but not limited to, a polystyrene sulfonic acid mixed with a quaternary salt) can be used for treating of the processing solution. Likewise, other type filters or filter-like material may be placed in retaining area 431 for removing other particulate matter. It is, of course, to be understood that any desired number of chambers and sections may be provided and filled with any desired chemical or particulate filtering material.

Figure 13:
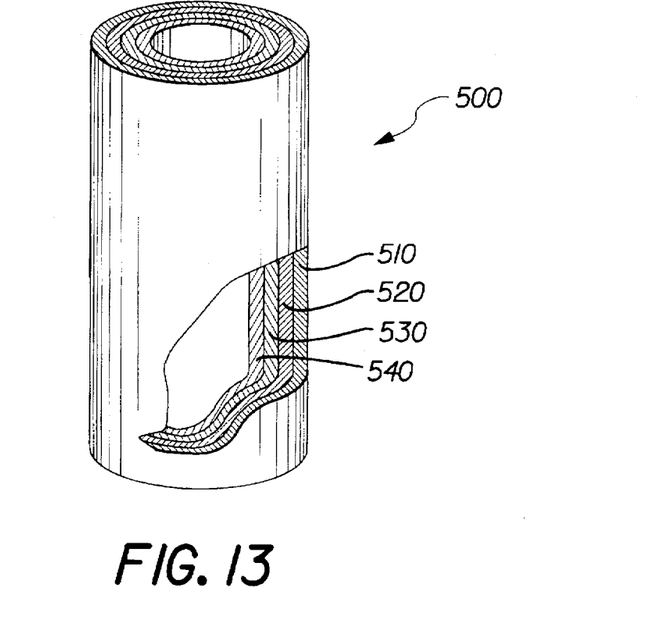
FIG. 13 is a perspective view, partially broken away, of a modified filter for use in a filter assembly made in accordance with the present invention.

Referring to FIG. 13 there is illustrated modified filter 500 designed for use in a filter assembly made in accordance with the present invention. In particular filter 500 comprises four layer 510,520,530,540 disposed in touching concentric layer. Each layer 510,520,530,540 is preferably made of a different material for filtering out different components in the processing solution.

Figure 14:
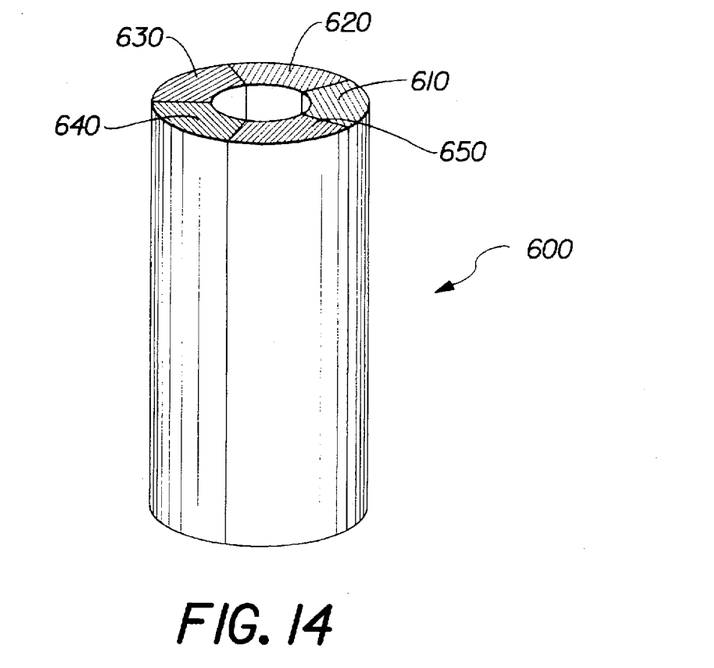
FIG. 14 is a perspective view, partially broken away, of a yet another modified filter for use in a filter assembly made in accordance with the present invention.

Referring to FIG. 14 there is illustrated another modified filter 600 designed for use in a filter assembly made in accordance with the present invention. In particular, filter 600 comprises five vertical sections 610,620,630,640,650 disposed adjacent to each other. Each section 610,620,630, 640,650 is preferably made of a different material for filtering out different components in the processing solution.

Means may be provided to prevent misapplication of the filter assembly on the manifold so that the processing solution flows in the correct direction through the filter. For example the filter assembly and manifold assembly may be designed so that each has a male halve valve assembly and a female half valve assembly. This would require the application of the components in only one way so that the appropriate inlets and outlets are properly matched up. It is to be understood that any other means may also be used to prevent misapplication of the two components.

The present invention provides an improved photographic processor and filter assembly which allows for quick and easy removal of the filter assembly, minimizes leaks, and further allows for the placement of the filter assembly in any position with respect to the solution level of the tank. Additionally, the filter assembly minimizes the possibility of retaining trapped air within the filter housing.

It is also to be further understood that various changes and modifications may be made without departing from the scope of the present invention, the present invention being limited by the following claims.

Parts list:

10 . . . processing apparatus
12 . . . recirculation system
14 . . . replenishment system
20 . . . processing tank
22 . . . processing solution
24 . . . rack
25 . . . inlet port
26 . . . sensitized material
28 . . . entry roller pair
30 . . . turn-around roller
32 . . . exit roller pair
34 . . . sensitized goods rack
36 . . . recirculation pump
38,39,40 . . . conduits
44 . . . arrows
46 . . . tank outlet
47 . . . filter assembly
182 . . . heater
56 . . . overflow conduit
58 . . . overflow port
60,61 . . . control and logic unit
62 . . . wire
64 . . . temperature sensor
66 . . . wire
68,69,70 . . . metering pumps
72 . . . conduit
74 . . . motor
76 . . . connecting linkage
78 . . . photosensitive material sensor
80 . . . wire
82 . . . wire
90 . . . mounting manifold
92 . . . inlet port
94 . . . outlet port
96 . . . supply passage
98 . . . half valve section
100 . . . inlet half valve section
102 . . . body portion
103 . . . resilient member
104 . . . stop member
105 . . . opening
106 . . . closed position spring
107 . . . wall/partition
112 . . . housing
114 . . . inlet port
116 . . . outlet port
118 . . . internal chamber
120,121 . . . passages
122 . . . filter member
124 . . . projecting member
126 . . . bottom wall 130 ... lid assembly
132 ... lid
134 ... clamping ring
136 ... sealing member
137 ... O-ring
148 ... annular projecting portion
152,154 ... sealing surfaces
156 ... inner surface
158 ... flange members
160 ... sealing lip section
162 ... bottom surface
164 ... annular flange
170 ... lid
172 ... bottom surface
180 ... top
181,183 ... wires
182 ... heating element
185 ... threaded cap
186 ... engaging threads
188 ... projecting member
190 ... modified mounting manifold
202,204 ... mating half valve section
218 ... ports
224 ... body member
226 ... proboscis member
228 ... longitudinal channel
230 ... radial fluid ports
232 ... fluid passage
234 ... closed end portion
235 ... radial flange
236 ... blocking member
237 ... O-rings
238 ... spring member
239 ... shoulder
240,241 ... registration surface
243 ... annular lip
256 ... first body member
258 ... entrance ports
259 ... flared lip
260 ... hollow piston
262 ... spring member
264 ... terminal end
270 ... latching member
280 ... air bleed passage
282 ... first connecting end
284 ... second outlet end
300 ... modified filter assembly
320 ... manual turn valve
321 ... threaded opening
400 ... modified filter assembly
410,420,430 ... concentric wall members
411,421,431 ... retaining areas

We claim:

1. A photographic processor comprising:
a processing section containing at least one processing tank having a processing solution therein, said at least one processing tank having an outlet and an inlet, a recirculation system connected to the inlet and the outlet of said tank for recirculating and processing solution through the tank, and a filter and manifold assembly disposed in the recirculation system for filtering of said process solution being circulated through said recirculation system, said filter and manifold assembly comprising:
a manifold comprising a body having an inlet port, an outlet port, a connecting passage between said inlet port and said outlet port and means for dividing the connecting passage into a first receiving section and a second delivery section, said manifold being disposed in line in said recirculation system such that the inlet port receives fluid from the recirculation system and the outlet port returns the recirculation fluid to the recirculation system, said manifold having a first half valve section in fluid communication with said inlet port and a second half valve section in fluid communication with the outlet port, said first half valve section and said second half valve section each being flexibly mounted to said manifold through a resilient member means for allowing a sufficient degree of movement of each of the first and second half valve sections to properly align with a mating half valve section on said filter assembly; and
a filter assembly comprising a housing having an internal chamber, a chamber inlet for allowing processing solution to flow into said internal chamber, a filter media positioned in said internal chamber for filtering processing solution flowing from said filter assembly inlet to said filter assembly outlet, a third half valve section designed to couple with said first half valve section so as to provide fluid communication therethrough, and a forth half valve section designed to couple with said second half valve section so as to provide a fluid communication passage through said filter assembly, said coupled valve sections allowing quick connection and disconnecting of said filter assembly with the recirculating system without any substantial loss of fluid.

2. A photographic processor according to claim 1, wherein a heater is provided in said filter assembly.

3. A photographic processor according to claim 1, wherein said filter assembly is positioned at a point below the level of the processing solution in said tank.

4. A photographic processor according to claim 1, wherein said housing includes a detachable lid for allowing a filter element to be placed in said internal chamber.

5. A photographic processor according to claim 1, wherein said filter assembly is positioned in any desired orientation.

6. A photographic processor according to claim 1, wherein said means for dividing said connecting passage comprises a threaded turn valve which engages a threaded opening in said manifold such that when the turn valve is fully threaded it will block the connecting passage.

7. A photographic processor according to claim 1, wherein said means for dividing said connecting passage comprises a partition.

8. A photographic processor according to claim 7, further comprising a fluid stop member for allowing fluid to pass through said partition, an opening in said partition through which said stop member extends, and a spring for biasing said stop member in an open or closed position.

9. A photographic processor according to claim 1, wherein said housing further includes an air bleed passage for removing trapped air within the internal chamber.

* * * * *

UNITED STATES PATENT AND TRADEMARK OFFICE
CERTIFICATE OF CORRRECTION

PATENT NO.  : 5,753,111
DATED       : May 19, 1998
INVENTOR(S) : Patton et al.

It is certified that error appears in the above-identified patent and that said Letters Patent is hereby corrected as shown below:

On the title page, item [56], please add --

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
|  |  | 5 | 1 | 4 | 8 | 2 | 0 | 8 | 9/15/92 | Klosterboer et al. |  |  |  |
|  |  | 4 | 6 | 6 | 9 | 8 | 4 | 7 | 6/2/87 | Taniguchi et al. |  |  |  |
|  |  |  |  |  |  |  |  |  |  |  |  |  |  |

Signed and Sealed this

Fourth Day of May, 1999

Attest:

Attesting Officer

Q. TODD DICKINSON

Acting Commissioner of Patents and Trademarks